UNITED STATES PATENT OFFICE 2,467,528

MANUFACTURE OF SHAPED METAL-CONTAINING CERAMIC ARTICLES

Max Hauser, Zurich, Switzerland

No Drawing. Application September 2, 1944, Serial No. 552,567. In Switzerland May 24, 1943

3 Claims. (Cl. 25—156)

Numerous substances in the state of a powder may be united to form a rigid, solid piece at a temperature far below their melting point under the influence of heat or pressure, or both. Metal compacts may, for example, be obtained in such a manner from metal powders. Such methods, termed fritting, welding or sintering, are extensively employed in powder metallurgy and ceramics.

Sintering processes at high temperatures are commonly used in the case of clays. Such compounds, complex hydrosilicates, have a further important property. They assume a plastic state by the addition of water or some other liquids. The plasticity of certain types of clay is so great that a very considerable quantity of non-plastic materials may be incorporated in the body. This fact is of great practical importance to the ceramic industry. A comparatively small admixture of highly plastic clay may suffice for the production of plastic bodies from non-plastic materials. Graphite crucibles, silicon ware, silicon carbide refractories, for example, are manufactured in this way.

The present invention relates to an improved process by the aid of which metallic articles and metal containing ceramics may be manufactured by a plastic body according to the methods employed in the ceramic industry. The raw bodies may be thrown on a potter's wheel, moulded, extruded through a mouthpiece, pressed in a die, or shaped by slip-casting. The dryed, shaped articles are fired in an atmosphere devoid of oxygen to prevent oxidation.

It has previously been proposed to manufacture ceramic articles from a mixture of ceramic raw materials and metal powders or powdered alloys. (U. S. Pat. 1,790,918). But no satisfactory results are thereby obtainable, even when the shaped articles are fired in an atmosphere devoid of oxygen. Protracted investigation has shown that the failure of the aforesaid process is due to the nature and behaviour of the clay binder.

The essential constituents of the clay are the hydrosilicates, for example kaolinite $$Al_2O_3 \cdot 2SiO_2 \cdot 2H_2O$$

a hydrosilicate of alumina.

When clay is submitted to the influence of heat, the chemically bound water is eliminated. Dehydration commences, in kaoline, about 400° C. and continues up to about 700° C. For other hydrosilicates the temperatures may differ.

At the temperatures of dehydration the water-vapour evolved will react with the metal. If the body contains iron, the following equations will illustrate the possible reactions.

$$Fe + H_2O \rightleftarrows FeO + H_2$$

$$3Fe + 4H_2O \rightleftarrows Fe_3O_4 + 2H_2$$

These reactions are reversible and tend to an equilibrium. In which direction they run depends on the relative quantities of hydrogen and water. If water-vapour is added, the reaction will occur as indicated above—from the left to the right—thereby the iron is oxidised. If water-vapour is removed and replaced by hydrogen, the reaction will take opposite direction—from the right to the left—the iron oxide is reduced. For other metals the conditions for reaction are similar.

The dry raw bodies are porous. The gas in the pores may have a different composition to the gas surrounding the article. The pores are small, therefore the gas diffusion is low. At the high temperature of the firing process water is liberated, which oxidises the metal in the bodies. This reaction continues till the hydrosilicates are completely decomposed. As the temperature rises the metal oxides form silicates with a low melting point. These seal the pores and soften the material.

Experiment proved it possible to overcome the described difficulties in a completely satisfactory manner.

The heat-treatment can be carried out in three stages. Firstly, the dryed, shaped articles are submitted to a temperature sufficient to decompose the hydrosilicates, but at which the material remains porous. Secondly, the anhydrous article is heated sufficiently long to effect the reduction of the oxides produced in the first stage. Thirdly, the temperature is raised so far to produce the desired degree of cohesion.

A body containing metal will lead to the formation of metal oxide, even then, when it is fired in a vacuum or an atmosphere of reducing gases. This metal oxide must be reduced during the period in which the article retains its original porosity. Therefore, it is possible to shape the body from a mixture of clay and metal oxides, or ore, instead of metal powder. This presents in practice considerable advantages. Oxides or ores can be reduced to the state of a powder far better than metals. The dehydration process is simpler, because in this case no oxygen-free atmosphere is necessary.

In the reducing operation the reducing agent must penetrate into the material by diffusion through the pores. The spent gas has to be replaced by fresh reducing gas. The reduction process therefore requires considerable time. If a stream of hydrogen is employed, the completion of the reaction is indicated by the absence of water in the tailing-gas from the furnace. At this stage the temperature is raised to obtain the desired degree of sintering.

The following example will illustrate the new process, which is not restricted to the use of the substances cited; the iron oxide may be replaced by other metal oxides or metal powders.

A mixture is made of 20 parts by weight of refractory clay, in the state of a powder, and 80 parts by weight of powdered magnetite (iron oxide).

This mixture is moistened to a plastic body which is shaped to the desired article. Upon heating to about 700° C. the hydrate water is driven off. The temperature is maintained or increased to about 800° C., hydrogen gas is introduced to reduce the iron oxide in the porous article as completely as possible to metallic iron. This effected, the temperature of the furnace is raised to sinter and bind the article sufficiently.

In the manufacture of the described articles, many different raw materials can be used and these can be mixed in a wide range of proportions. Suitable metallic components are iron, copper, nickel, tungsten, molybdenum and all metals that can be liberated from their oxides by the aid of hydrogen. Also, their oxides can be employed—or ores. If two, or more, metals or oxides are used simultaneously they may be alloyed by the sintering process. Chrome, manganese or silicon for example, which are difficult to reduce from their oxides, are used as metals or alloys. These possess considerable resistance against oxidation by water-vapour.

As binders to impart plastic properties to the body, minerals containing hydrosilicates—such as clay, kaoline, talc (steatite), bentonite, halloysite or allophane may be used. The usual ceramic raw materials may be added to the mixture of metal or metal oxides and hydrosilicate binders. Fluxes such as felspar, boric acid, borates are often serviceable to lower sintering temperature or to remove a residue of oxide from the metal particles. Furthermore non-plastic materials may be added to the mixture such as silica, clay-grog or silicon carbide.

The reducing gas may be hydrogen, carbon monoxide, a hydrocarbon, or a mixture of these agents. In the place of a gas the articles may be inclosed in a container together with the necessary amount of carbon for the production of carbon monoxide.

The composition of the body, the particle size of the constituents, the working temperature and the duration of the sintering process are factors that exert an influence on the porosity or density of the finished products. These either resemble metallic or ceramic products, according to the nature of the initial raw materials and their proportion in the mixture.

The products manufactured according to the described new process may be considered as metallic articles containing silicates, or as ceramic articles containing metal. Their metallic properties may be graduated by the selection of the raw material. Their mechanical, chemical, electric and magnetic properties may be adjusted to individual requirements, for example electric heating devices.

What I claim is:

1. The process for the manufacture of shaped metal-containing ceramic articles from a plastic composition which contains plasticizing hydrosilicate and at least one of the metalliferous materials adapted to be reduced to metal from their oxides by reducing gas, including the steps of shaping the plastic composition into articles of desired form, heating the shaped articles to decompose the hydrosilicate and thereby making the articles porous, treating the porous articles in a reducing atmosphere to convert the metal oxide into metal and then raising the temperature for effecting the sintering to a desired degree.

2. The process for the manufacture of shaped metal-containing ceramic articles from a plastic composition which contains plasticizing hydrosilicate and at least one of the metals adapted to be liberated from their oxide by a reducing gas, including the steps of shaping the plastic composition into articles of desired form, heating the shaped articles to decompose the hydrosilicate and thereby making the articles porous, treating the porous articles in a reducing atmosphere to convert the metal oxide into metal, and then raising the temperature for effecting the sintering to a desired degree.

3. The process for the manufacture of shaped metal-containing ceramic articles from a plastic composition which contains aluminum hydrosilicate and at least one metal oxide adapted to be reduced to metal by a reducing gas, including the steps of shaping the plastic composition into articles of desired form, heating the shaped articles to decompose the hydrosilicate and thereby making the articles porous, treating the porous articles in a reducing atmosphere to convert the metal oxide into metal, and then raising the temperature for effecting the sintering to a desired degree.

MAX HAUSER.

REFERENCES CITED

The following references are of record in the file of this patent:

UNITED STATES PATENTS

| Number | Name | Date |
|---|---|---|
| 1,790,918 | Hauser | Feb. 3, 1931 |
| 2,122,053 | Burkhardt | June 28, 1938 |
| 2,129,844 | Kiefer | Sept. 13, 1938 |
| 2,133,761 | Tietig | Oct. 18, 1938 |